(12) United States Patent
Li (10) Patent No.: US 12,328,672 B2
(45) Date of Patent: Jun. 10, 2025

(54) WAKE-UP SIGNAL PROCESSING METHOD AND APPARATUS, INFORMATION ISSUING METHOD AND APPARATUS, COMMUNICATION DEVICE, AND MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 603 days.

(21) Appl. No.: 17/627,811

(22) PCT Filed: Jul. 17, 2019

(86) PCT No.: PCT/CN2019/096423
§ 371 (c)(1),
(2) Date: Jan. 17, 2022

(87) PCT Pub. No.: WO2021/007824
PCT Pub. Date: Jan. 21, 2021

(65) Prior Publication Data
US 2022/0295397 A1    Sep. 15, 2022

(51) Int. Cl.
*H04W 52/02* (2009.01)
(52) U.S. Cl.
CPC ... *H04W 52/0229* (2013.01); *H04W 52/0216* (2013.01)
(58) Field of Classification Search
CPC .......... H04W 52/0229; H04W 52/0216; Y02D 30/70; G06F 9/4418
See application file for complete search history.

(56) References Cited

U.S. PATENT DOCUMENTS 9,477,292 B1    10/2016  Murali
2007/0250726 A1  10/2007  Rossetti et al.
(Continued)

FOREIGN PATENT DOCUMENTS

CN    104618996 A    5/2015
CN    106688264 A    5/2017
(Continued)

OTHER PUBLICATIONS

Hanlin Zhu et al., "Improvement and Implementation of MAC Protocol for WSN Based on Wake, Computer Engineering," Sep. 2010, 4 pages,vol. 36 No. 17, China.
Wenyang Xiao, "Research of Low Power RF Wake-Uptechnology Suitable for Wirelesssensor Network," Thesis, Apr. 2014, 84 pages, China.
(Continued)

*Primary Examiner* — Marcos L Torres
(74) *Attorney, Agent, or Firm* — Arch & Lake LLP; Hao Tan; Shen Wang (57) ABSTRACT

Embodiments of the present disclosure provide a wake-up signal processing method, an information issuing method, a communication device. The wake-up signal processing method comprises: determining frequentnesses Ni of a wake-up signal being applied to different types of first cycles, wherein each of Ni is the number of a corresponding first cycle in which a terminal maintains a sleep state during an On Duration, and respective values of Ni are 0 or a positive integer; and determining a terminal state of the terminal during the On Duration in a corresponding type of first cycle according to one of frequentnesses Ni and a monitoring result of the wake-up signal, wherein the terminal state is a wake-up state or the sleep state.

13 Claims, 5 Drawing Sheets

S110: Determine frequentnesses Ni of a wake-up signal being applied to different types of first cycles, wherein each of Ni is the number of a corresponding first cycle in which a terminal maintains a sleep state during an On Duration, and respective values of Ni are 0 or a positive integer S120: Determine a terminal state of the terminal during On Duration in a corresponding type of first cycle according to one of the frequentnesses Ni and a monitoring result of the wake-up signal, wherein the terminal state is a wake-up state or the sleep state

(56) References Cited

U.S. PATENT DOCUMENTS

| | | | |
|---|---|---|---|
| 2017/0290086 A1 | 10/2017 | Patel et al. | |
| 2018/0132176 A1 | 5/2018 | Abraham | |
| 2021/0204214 A1* | 7/2021 | Chang | H04W 72/1263 |
| 2022/0124623 A1* | 4/2022 | Seo | H04W 72/23 |

FOREIGN PATENT DOCUMENTS

| | | |
|---|---|---|
| CN | 107124751 A | 9/2017 |
| CN | 109155972 A | 1/2019 |
| CN | 109155973 A | 1/2019 |
| CN | 109219116 A | 1/2019 |
| CN | 109314869 A | 2/2019 |
| CN | 109644454 A | 4/2019 |
| CN | 109729550 A | 5/2019 |
| CN | 109803224 A | 5/2019 |
| CN | 109923904 A | 6/2019 |
| CN | 109937594 A | 6/2019 |

OTHER PUBLICATIONS

Liangqing Zhang et al., "Low Power Consumption Design of Multimode Terminal in Idle State, Telecommunication Engineering," Mar. 2017, 7 page,vol. 17 No. 3, China.

Soheil Rostami et al., "Novel Wake-Up Signaling for Enhanced Energy-Efficiency of 5G and beyond Mobile Devices, 7 pages," Dec. 9-13, 2018, Finland.

Chinese Patent Notice of Allowance of 201980001442.9, dated Mar. 30, 2023, 4 pages.

International Search Report of PCT/CN2019/095623 dated Mar. 26, 2020 with English translation, (4p).

International Search Report of PCT/CN2019/096423 dated Apr. 3, 2020 with English translation, (4p).

International Search Report of PCT/CN2019/096423 dated Mar. 26, 2020 with English translation, (4p).

State Intellectual Property Office People's Republic of China, First Office Action Issued in Application No. 201980001442.9, Jan. 6, 2022, (11 pages).

* cited by examiner

WAKE-UP SIGNAL PROCESSING METHOD AND APPARATUS, INFORMATION ISSUING METHOD AND APPARATUS, COMMUNICATION DEVICE, AND MEDIUM

CROSS REFERENCE

The present application is the U.S. national phase application of International Application No. PCT/CN2019/096423, filed on Jul. 17, 2019, the content of which is incorporated hereby in its entirety for all purposes.

TECHNICAL FIELD

The present disclosure relates to the field of wireless communication but is not limited to the field of wireless communication, and in particular to a wake-up signal processing method and apparatus, an information issuing method and apparatus, and a non-transitory computer-readable storage medium.

BACKGROUND

The terminal has a Discontinuous Reception (DRX) state, and the terminal in the DRX state has lower power consumption than the terminal in a continuous reception state.

In order to further save the power consumption of the terminal in the DRX state, a wake-up signal (i.e., WUS) is also introduced. The WUS is sent before On Duration. The terminal monitors the WUS to determine whether the wake-up state needs to be maintained in a subsequent On Duration to monitor the PDCCH.

SUMMARY

The embodiments of the present disclosure provide a wake-up signal processing method and apparatus, an information issuing method and device communication device, and a non-transitory computer-readable storage medium.

According to a first aspect of the embodiments of the present disclosure, there is provided a wake-up signal processing method. The wake-up signal processing method may include: determining frequentnesses Ni of a wake-up signal being applied to different types of first cycles, respectively, wherein each of Ni is a number of a corresponding first cycle in which a terminal maintains a sleep state during an On Duration, and respective values of Ni are 0 or a positive integer; and according to the frequentness and a monitoring result of the wake-up signal, determining a terminal state of the terminal during the On Duration in a corresponding type of first cycle, wherein the terminal state is a wake-up state or the sleep state.

According to a second aspect of the embodiments of the present disclosure, there is provided an information issuing method. The information issuing method may include issuing a radio resource control RRC message or a MAC CE carrying a frequentness of a wake-up signal being applied to a first cycle.

According to a third aspect of the disclosure, there is provided a wake-up signal processing apparatus. The wake-up signal processing apparatus may include: a first determination module configured to respectively determine frequentnesses Ni of a wake-up signal being applied to different types of first cycles, wherein each of Ni is a number of a corresponding first cycle in which a terminal maintains a sleep state during an On Duration, and respective values of Ni are 0 or a positive integer; and a second determination module configured to determine a terminal state of the terminal during the On Duration in a corresponding type of first cycle, according to the frequentness and a monitoring result of the wake-up signal, wherein the terminal state is a wake-up state or the sleep state.

According to a fourth aspect of the disclosure, there is provided an information issuing apparatus. The information issuing apparatus may include an issuing module configured to issue a radio resource control RRC message or a MAC CE carrying a frequentness of a wake-up signal being applied to a first cycle.

According to a fifth aspect of the disclosure, there is provided a communication device. The communication device may include: a transceiver; a memory; and a processor, the processor is connected to the transceiver and the memory respectively, and is configured to control a transmission and a reception of the transceiver by executing computer-executable instructions stored on the memory, and implement the wake-up signal processing or the information issuing method according to technical solutions mentioned above.

According to a sixth aspect of the disclosure, there is provided a non-transitory computer-readable storage medium on which computer-executable instructions are stored; after the computer-executable instructions are executed by a processor, the wake-up signal processing or the information issuing method according to technical solutions mentioned above is implemented.

DETAILED DESCRIPTION

The network architecture and business scenarios described in the embodiments of the present disclosure are to illustrate the technical solutions of the embodiments of the present disclosure more clearly, and do not constitute a limitation to the technical solutions provided by the embodiments of the present disclosure. Those of ordinary skill in the art will know that with the evolution of the network architecture and the emergence of new business scenarios, the technical solutions provided in the embodiments of the present disclosure are equally applicable to similar technical problems.

Figure 1:
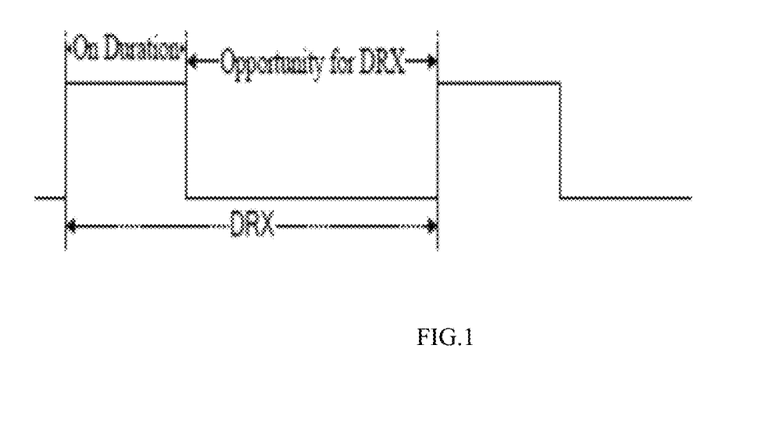
FIG. 1 is a schematic diagram of a DRX.

In the DRX state, a DRX cycle is set. As shown in FIG. 1, one DRX cycle includes a wake-up period (i.e., On Duration) and a sleep period (i.e., Opportunity for DRX).

During On Duration, the terminal is in a wake-up state, and the terminal shall monitor a physical downlink control channel (PDCCH); while during the Opportunity for DRX, the terminal is in a sleep state, and the terminal may not monitor the PDCCH.

Figure 2:
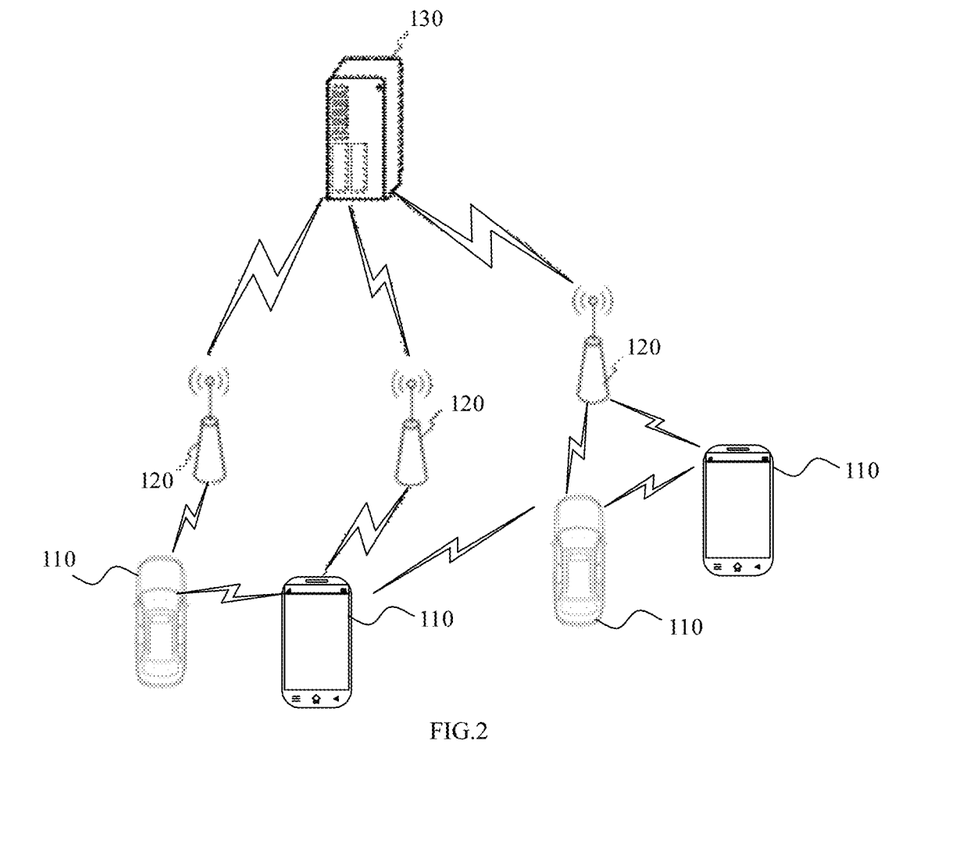
FIG. 2 is a schematic structural diagram of a wireless communication system provided by some embodiments according to the present disclosure.

FIG. 2 shows a schematic structural diagram of a wireless communication system provided by some embodiments of the present disclosure. As shown in FIG. 2, the wireless communication system is a communication system based on cellular mobile communication technology. The wireless communication system may include several terminals 110 and several base stations 120.

Wherein, the terminal 110 may be a device that provides voice and/or data connectivity to the user. The terminal 110 can communicate with one or more core networks via a radio access network (RAN). The terminal 110 can be an Internet of Things terminal, such as a sensor device, a mobile phone (or "cellular" phone), and a computer having the Internet of Things terminal. For example, the terminal 110 may be a fixed, portable, pocket-sized, handheld, computer built-in, or a vehicle-mounted device. For example, it may be station (STA), subscriber unit, subscriber station, mobile station, mobile, remote station, access point, remote terminal, access terminal, user terminal, user agent, user device, or user equipment. Alternatively, the terminal 110 may also be a device of an unmanned aerial vehicle. Alternatively, the terminal 110 may also be a vehicle-mounted device. For example, it may be a trip computer with a wireless communication function, or a wireless communication device externally connected to the trip computer. Alternatively, the terminal 110 may also be a roadside device, for example, it may be a street lamp, signal lamp, or other roadside device with a wireless communication function.

The base station 120 may be a network side device in a wireless communication system. Among them, the wireless communication system may be the 4th generation mobile communication (4G) system, also known as the Long Term Evolution (LTE) system. Alternatively, the wireless communication system may also be a 5G system, which is also known as the new radio (NR) system or 5G NR system. Alternatively, the wireless communication system may also be the next-generation system of the 5G system. Among them, the access network in the 5G system can be called as New Generation-Radio Access Network (NG-RAN).

Among them, the base station 120 may be an evolved base station (eNB) used in a 4G system. Alternatively, the base station 120 may also be a base station (gNB) adopting a centralized and distributed architecture in the 5G system. When the base station 120 adopts a centralized and distributed architecture, it usually includes a central unit (CU) and at least two distributed units (DU). The central unit is provided with a protocol stack of a packet data convergence protocol (PDCP) layer, a radio link control protocol (RLC) layer, and a media access control (MAC) layer. The distributed unit is provided with a physical (PHY) layer protocol stack. The embodiment of the present disclosure does not limit the specific implementation manner of the base station 120.

A wireless connection can be established between the base station 120 and the terminal 110 through a wireless air interface. In different embodiments, the wireless air interface is a wireless air interface based on the fourth-generation mobile communication network technology (4G) standard. Alternatively, the wireless air interface is a wireless air interface based on the fifth-generation mobile communication network technology (5G) standard. For example, the wireless air interface is a new radio. Alternatively, the wireless air interface may also be a wireless air interface based on a 5G-based next-generation mobile communication network technology standard.

In some embodiments, an End to End (E2E) connection may also be established between the terminals 110, for example, vehicle to vehicle (V2V) communication, vehicle to Infrastructure (V2I) communication, and a vehicle to pedestrian (V2P) communication in vehicle to everything (V2X) communication.

In some embodiments, the above-mentioned wireless communication system may further include a network management device 130.

Several base stations 120 are connected to the network management device 130 respectively. The network management device 130 may be a core network device in a wireless communication system. For example, the network management device 130 may be a mobility management entity (MME) in Evolved Packet Core (EPC) network. Alternatively, the network management device may also be other core network devices, such as Serving Gate Way (SGW), Public Data Network Gate Way (PGW), Policy and Charging Rules Function (PCRF) or Home Subscriber Server (HSS), etc. The implementation form of the network management device 130 is not limited in the embodiment of the present disclosure.

Figure 3A:
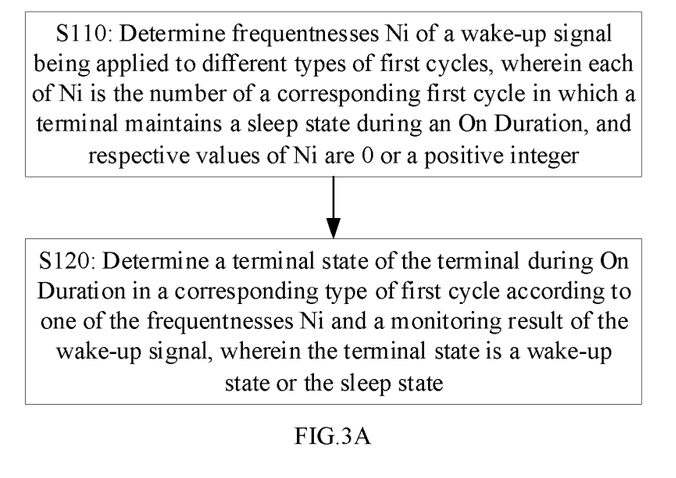
FIG. 3A is a schematic flowchart of a wake-up signal processing method provided by some embodiments according to the present disclosure.

As shown in FIG. 3A, this embodiment provides a wake-up signal processing method. The wake-up signal processing method is used for monitoring a physical downlink control channel (PDCCH). The method includes followings steps.

In a step S110, frequentnesses Ni of a wake-up signal being applied to different types of first cycles are determined respectively, wherein each of Ni is the number of a corresponding first cycle in which a terminal maintains a sleep state during an On Duration, and values of Ni are 0 or a positive integer, and wherein, the frequentnesses Ni means one or more frequentness.

In a step S120, a terminal state of the terminal during On Duration in a corresponding type of first cycle is determined according to the frequentness and a monitoring result of the wake-up signal, wherein the terminal state is a wake-up state or the sleep state.

The DRX cycle of the terminal can be divided into a first cycle and a second cycle, wherein the second cycle can be greater than the first cycle. In some cases, the first cycle can be called as a short cycle, and the second cycle can be called a long cycle.

The first cycle is further divided into different types, for example, a first type and a second type. The first type of first cycle and the second type of first cycle may be determined according to distribution positions of the first cycle in a time domain.

In this embodiment, the setting reasons for the first cycles being set in different positions are different, and then the data receiving and sending tasks and/or requirements of first cycles are also different.

In this embodiment, respective frequentnesses Ni of the wake-up signal being applied to different types of first cycles are first determined. Each of frequentnesses Ni may be determined according to a mapping relationship between the corresponding wake-up signal and the On Duration. For example, when the mapping relationship between the wake-up signal and the On Duration is 1:N, then the frequentness of the wake-up signal is N. One DRX cycle includes one Opportunity for DRX and one On Duration, if one of the frequentnesses Ni of the wake-up signal is N, then the mapping relationship of 1:N corresponds to N DRX cycles.

In this embodiment, the values of Ni can be 0 or a positive integer.

When N is 0, the On Duration corresponding to the wake-up signal is 0. At this time, the wake-up signal does not affect terminal states of the terminal during the Opportunity for DRX and the On Duration in the DRX cycle, that is, the terminal state and terminal behavior are controlled according to the original DRX cycle. At this time, the terminal does not need to monitor the wake-up signal (WUS).

When N is the positive integer, the On Duration corresponding to the wake-up signal is not 0, and one wake-up signal will at least make the terminal maintain the sleep state instead of the wake-up state during the On Duration of one DRX cycle, thereby reducing the power consumption of the terminal.

For example, when N is 1, the mapping relationship between the wake-up signal and the On Duration is 1:1, that is, if the terminal monitors one wake-up signal, it will be kept in a monitoring state (i.e., the wake-up state) during the On Duration of one first cycle in which the wake-up signal takes effect. If the terminal does not monitor one wake-up signal, it will be kept in the sleep state during the On Duration of one first cycle in which the wake-up signal takes effect.

For another example, when N is equal to or greater than 2, the mapping relationship between the wake-up signal and the On Duration is equal to 1:2 or less than 1:2. When the mapping relationship between the wake-up signal and the On Duration is equal to 1:2, if the terminal monitors one wake-up signal, it will be kept in the wake-up state during the On Duration of two first cycles in which the wake-up signal takes effect, and if the terminal does not monitor one wake-up signal, it will be kept in the sleep state during the On Duration of two first cycles in which the wake-up signal takes effect. When the mapping relationship between the wake-up signal and the On Duration is less than 1:2, if the terminal monitors one wake-up signal, it will be kept in the wake-up state during the On Duration of more than two first cycles in which the wake-up signal takes effect, and if the terminal does not monitor one wake-up signal, it will be kept in the sleep state during the On Duration of more than two first cycles in which the wake-up signal takes effect.

In this embodiment, the frequentnesses for different types of the first cycles may have different applicable frequentnesses. In this way, making a distinction between maintaining the wake-up state and maintaining the sleep state during On Duration in the corresponding type of first cycle is achieved, so as to, on the one hand, reduce the power consumption as much as possible, and on the other hand, minimize data transmission delays and failures.

In a step S120, according to the frequentness N, it can be determined whether current first cycle is an effective range that has monitored a wake-up signal or an effective range that has not monitored a wake-up signal. If the current first cycle is the effective range that has monitored a wake-up signal, then a state of the terminal during the corresponding On Duration is controlled according to the monitoring result of the wake-up signal. For example, if the monitoring result is that the wake-up signal is not monitored, the terminal is controlled to still keep into the sleep state during the On Duration. In this way, the terminal in the sleep state will not monitor the PDCCH channel. If the monitoring result is that the wake-up signal is monitored, the terminal is controlled to keep into the wake-up state during the On Duration. In this way, the terminal in the wake-up state can monitor the PDCCH channel, thereby receiving the PDCCH message transmitted on the PDCCH channel.

In some embodiments, types of the first cycles include:
a first type of first cycle, which is located after a drx-Inactivity Timer expires;
a second type of first cycle, which is located after a control unit of a media access control layer (MAC CE) is issued.

The drx-Inactivity Timer means the inactive time and is used to extend the On Duration. For example, if the terminal has a relatively large amount of data to be transmitted after one On Duration, then by setting one drx-Inactivity Timer, the wake-up state is extended with a timing length of the drx-Inactivity Timer after the On Duration ends, so as to facilitate the transmission of the required transmission data and reduce the data delay.

Some of the first cycles are set after the drx-Inactivity Timer, so that when a large amount of data needs to be sent or received by the terminal, the On Duration of the first cycle is used to receive the data, so as to reduce the data transmission delay.

The first cycle also includes the second type of first cycle, and this second type of first cycle is located at a first cycle after the MAC CE.

In this embodiment, the MAC layer may include: MAC CE and MAC protocol data unit (PDU). The MAC CE sends generally a signaling; while the MAC PDU carries data interacted between the terminal and the base station.

In the embodiment of the present disclosure, the second type of first cycle may locate at a first cycle after the MAC CE issues.

For example, after MAC CE, the network side may have some sporadic data that needs to be sent to the terminal, or the terminal still has some sporadic data that needs to be reported to the network side. At this time, the first cycle may be set.

Therefore, the necessity for the first type of first cycle and the second type of first cycle to remain in the wake-up state instead of the sleep state during the On Duration is substantially inconsistent. Therefore, the necessity of monitoring WUS is also inconsistent. In view of this, in this embodiment, it is necessary to distinguish the frequentness setting of WUS in the first type of first cycle and the frequentness setting of WUS in the second type of first cycle.

In some embodiments, the frequentness of the wake-up signal for the first type of first cycle is the same as the frequentness of the wake-up signal for the second type of first cycle.

In other embodiments, the frequentness of the wake-up signal for the first type of first cycle is different from the frequentness of the wake-up signal for the second type of first cycle.

In different transmission scenarios, the frequentness of the first type of first cycle and the frequentness of the second type of first cycle may be the same or different. However, when setting the frequentness of WUS, it is applicable to the first type of first cycle and the second type of first cycle in the current scenario.

Figure 3B:
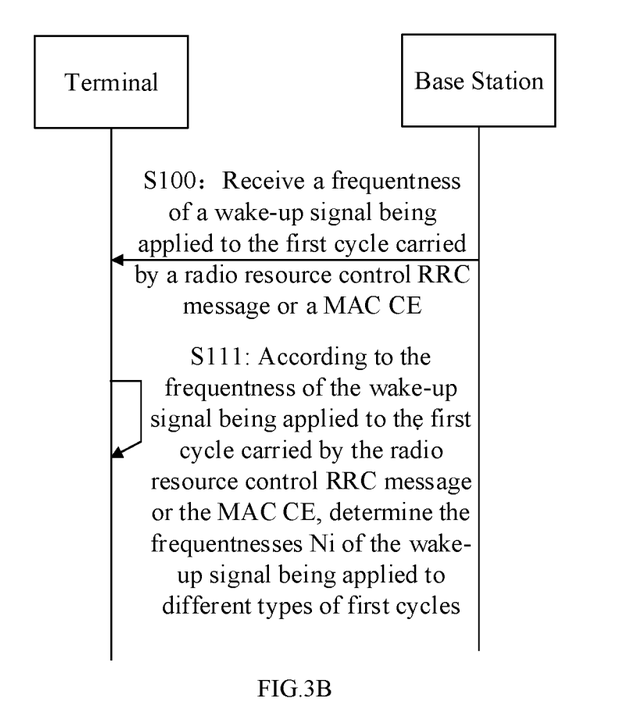
FIG. 3B is a schematic flowchart of another wake-up signal processing provided by some embodiments according to the present disclosure.

In some embodiments, the method shown in FIG. 3B further includes the following steps.

In a step S100, a frequentness M of a wake-up signal being applied to the first cycle is received, and the frequentness M is carried by a radio resource control RRC message or a MAC CE.

The method further includes a step S111, and said step S111 may include: according to the frequentness M of the wake-up signal being applied to the first cycle carried by the radio resource control RRC message or the MAC CE, determining frequentnesses Ni that of the wake-up signal being applied to different types of first cycles.

In this embodiment, the frequentness of the wake-up signal being applied to the first cycle is issued through RRC message or MAC CE.

In some embodiments, the RRC message or MAC CE may carry the frequentnesses for various types of first cycle. In some other embodiments, the RRC message or MAC CE only carries the frequentness for some types of first cycle.

For example, for the first type of first cycle and the second type of first cycle, a defaulted frequentness issued by the RRC message and MAC CE is the frequentness for one of two types of first cycles, and the frequentness for the other one (i.e., the other type of first cycle) may be a predetermined frequentness, or it may the same as the frequentness of the second cycle.

In this way, the RRC message and the MAC CE may only issue the frequentness of the wake-up signal being applied to only one type of first cycle. Compared with the RRC message and the MAC CE issuing more frequentnesses of the wake-up signal being applied to each type of first cycle, the signaling overhead can be reduced.

For example, the frequentness of the wake-up signal being applied to the first cycle, which is carried by the RRC message or the MAC CE, is a frequentness being applied to the first type of first cycle, and is not a frequentness being applied to the second type of first cycle.

In some embodiments, the frequentness of the wake-up signal being applied to the second type of first cycle is the same as the frequentness of the wake-up signal being applied to the second cycle, wherein the second cycle is greater than the first cycle.

In other embodiments, the frequentness of the wake-up signal being applied to the first cycle, which is carried by the RRC message or the MAC CE, is a frequentness being applied to the second type of first cycle, and is not a frequentness being applied to the first type of first cycle.

In some embodiments, the frequentness of the wake-up signal being applied to the first type of first cycle is the same as the frequentness of the wake-up signal being applied to the second cycle.

In some embodiments, the frequentness for the first type of first cycle explicitly indicated in the RRC message or MAC CE may be specified by the protocol.

For example, the frequentness of the wake-up signal being applied to the first type of first cycle, which is carried by the RRC message or MAC CE, is specified as frequentness M1.

Furthermore, the frequentness of the wake-up signal being applied to the second type of first cycle, which is carried by the RRC message or MAC CE, is specified as frequentness M2.

Here, M1 and M2 can be the same or different.

If the RRC message or MAC CE directly carries two frequentness of wake-up signals for two types of first cycles, then the frequentness of the wake-up signal being applied to the first type of first cycle and the frequentness of the wake-up signal being applied to the second type of first cycle are directly determined according to the RRC message or MAC CE.

In some embodiments, the frequentness of the wake-up signal being applied to the first cycle, which is carried by the RRC message or MAC CE, is a frequentness being applied to the first cycle between current indication and the next indication, wherein the current indication means indicating the frequentness by the network side at present, that is, current issuing or carrying of the RRC message or MAC CE, and the next indication means indicating a frequentness of a wake-up signal being applied to the first cycle by the network side again.

Herein, said first cycle between current indication and the next indication mentioned above may be determined by a duration between the base station indicates the frequentness twice.

In other embodiments, the frequentness of the wake-up signal being applied to the first cycle, i.e., frequentness carried by the RRC message or MAC CE, is a frequentness being applied to the first cycle within an effective range of one wake-up signal.

For example, if the frequentness of a wake-up signal is M, the effective range of the wake-up signal is M On Durations in M first cycles, and the applicable range of the frequentness is the first cycle in the effective range corresponding to the wake-up signal.

In this way, the base station can, according to the business requirements, dynamically issue the frequentness via the RRC message or the MAC CE, and dynamically adjust the frequentness of the wake-up signal being applied to one or more types of first cycles.

For example, both the RRC message and the MAC CE can carry the frequentness M of wake-up signal being applied to the first cycle. In this embodiment, according to whether current RRC message or current MAC CE has free bits to carry the frequentness M or considering delay habits for the issue, the RRC message or MAC CE that meets the delay requirements can be selected to carry the frequentness M.

Therefore, in some embodiments, the network side (for example, the base station) may indicate the frequentness M twice (i.e., a first time and then a second time), and the two indications may use different messages or signaling. For example, the one indication is issued by an RRC message, and the next indication is issued by an MAC CE. Whether to use RRC message or MAC CE can be comprehensively determined according to the urgency of issuing and whether there are idle bits in the RRC message and MAC CE.

Therefore, in some embodiments, the frequentness of the wake-up signal being applied to the first cycle carried by the RRC message or the MAC CE is a frequentness being applied to the first cycle between current indication and the next indication from network side indicating a frequentness of a wake-up signal being applied to the first cycle may include any one of the followings:

the frequentness of the wake-up signal being applied to the first cycle carried by current MAC CE is a frequentness being applied to the first cycle between the current MAC CE and a next MAC CE carrying a frequentness of a wake-up signal being applied to the first cycle; or the frequentness of the wake-up signal being applied to the first cycle carried by current RRC message is a frequentness being applied to the first cycle between the current RRC message and a next RRC message carrying a frequentness of a wake-up signal being applied to the first cycle; or the frequentness of the wake-up signal being applied to the first cycle carried by current MAC CE is a frequentness being applied to the first cycle between the current MAC CE and a RRC message carrying a frequentness of a wake-up signal being applied to the first cycle next to the current MAC CE; or the frequentness of the wake-up signal being applied to the first cycle carried by current RRC message is a frequentness being applied to the first cycle between the current RRC message and a MAC CE carrying a frequentness of a wake-up signal being applied to the first cycle next to the current RRC.

In some embodiments, the frequentness of the wake-up signal being applied to the first cycle, carried by the MAC CE, can be applied to the first cycle triggered by issuing the MAC CE.

The issuing of MAC CE will trigger the first cycle. In the embodiment of the present disclosure, the MAC CE carrying the frequentness of the wake-up signal may also trigger a first cycle, and the frequentness of the wake-up signal is directly applicable to the first cycle triggered by the MAC CE carrying said frequentness. In this way, the MAC CE realizes, on the one hand, the triggering of the first cycle, and on the other hand, indicates the frequentness of the wake-up signal.

The system may configure the UE with a DRX short cycle or a DRX long cycle according to different business scenarios. The cycle lengths of the DRX short cycle and the DRX long cycle are relative and determined by the business scenarios.

In case that a DRX short cycle is configured, if the issuing of MAC CE is received, then entering into the DRX short cycle is triggered. At this time, the first cycle triggered by the issuing of MAC CE has time duration of current DRX short cycle, and the time duration of the first cycle can be a time length timed by the timer (i.e., drxShortCycleTimer) defined in the standard.

In some embodiments, the frequentness of the wake-up signal being applied to the first cycle is independent of the frequentness of the wake-up signal being applied to the second cycle.

Cycle lengths of the first cycle and the second cycle are different, and scenarios to which the first cycle and the second cycle are adapted are different. In this embodiment, the frequentness of the wake-up signal being applied to the first cycle and the frequentness of the wake-up signal being applied to the second cycle are independent of each other. On the one hand, it can make the network side has a targeted WUS issuance to reduce unnecessary WUS issuance, and on the other hand, it can take into account the high difficulty of WUS pattern design caused by the first cycle and the second cycle at the same time.

In other embodiments, the frequentness of the wake-up signal being applied to the first cycle and the frequentness of the wake-up signal being applied to the second cycle may be related to each other. For example, the frequentness of the wake-up signal being applied to the first cycle may be greater than that applied to the second cycle. This is set according to cycle lengths of the first cycle and the second cycle and the application scenario.

In some embodiments, the wake-up signal is not configured with a frequentness applied to the second cycle.

Since the cycle length of the second cycle is greater than the cycle length of the first cycle, the Opportunity for DRX of the second cycle itself is relatively long. In order to reduce the data transmission delay caused by the terminal staying dormant or sleep during the On Duration in the second cycle due to WUS issuance, the phenomenon that the second cycle stays dormant based on the monitored wake-up signal can be cancelled. At this time, the frequentness of the wake-up signal may not be set in the second cycle. In this way, the base station does not issue a wake-up signal for the second cycle, and the terminal does not monitor the wake-up signal for the second cycle, so that at least the power consumption caused by the terminal's unnecessary monitoring of WUS can be reduced, thereby again saving terminal power consumption and extending the standby time of the terminal.

According to the technical schemes of the present disclosure, the Discontinuous Reception (DRX) cycle of the terminal may include at least the first cycle, and the first cycle is further divided into at least two types. In the present disclosure, respective frequentnesses of a wake-up signal being applied to different types of first cycles would be distinguished, and by combining with the frequentness and the monitoring result of the wake-up signal, the terminal state of the terminal during the On Duration in the corresponding type of first cycle is controlled. Therefore, the terminal state is controlled at a more appropriate frequentness, which is determined according to different types of first cycles. On the one hand, the power consumption to maintain the wake-up state during the unnecessary On Duration is reduced; on the other hand, the data transmission delay or transmission failure phenomenon that needs to maintain the wake state but is in the sleep state during the On Duration is reduced.

Figure 4:
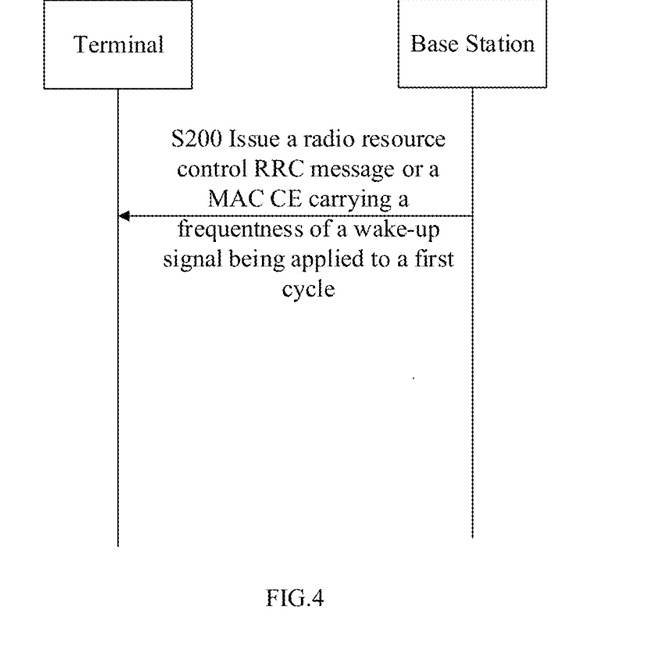
FIG. 4 is a schematic flowchart of an information issuing method provided by some embodiments according to the present disclosure.

As shown in FIG. 4, this embodiment provides an information issuing method, which includes the following steps.

In a step S200, a radio resource control RRC message or a MAC CE carrying a frequentness of a wake-up signal being applied to a first cycle is issued.

In some embodiments, the method further includes issuing the wake-up signal according to the frequentness of a wake-up signal being applied to a first cycle, and wherein the frequentness is carried by the RRC message or the MAC CE.

In this embodiment, the base station will issue the frequentness of the wake-up signal being applied to the first cycle via the RRC message or the MAC CE, so as to help the terminal to determine frequentnesses for different types of first cycles.

In some embodiments, the frequentness of the wake-up signal being applied to the first cycle send by the RRC message or the MAC CE is a frequentness being applied to the first type of first cycle, but is not a frequentness being applied to the second type of first cycle.

In other embodiments, the frequentness of the wake-up signal being applied to the first cycle send by the RRC message or the MAC CE is a frequentness being applied to the second type of first cycle, but is not a frequentness being applied the first type of first cycle.

In some other embodiments, the RRC message or MAC CE issues a frequentness M1 of wake-up signal being applied to the first type of first cycle, and the RRC message or MAC CE issues a frequentness M2 of wake-up signal being applied to the second type of first cycle.

M1 is 0 or a positive integer and M2 is 0 or a positive integer.

In some embodiments, according to the type of the first cycle and/or the application scenario in which the first cycle is located, the frequentness of the wake-up signal being applied to the first cycle is determined.

Figure 5:
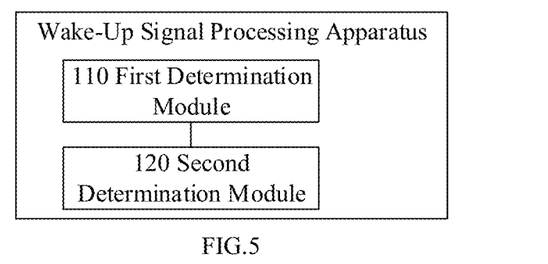
FIG. 5 is a schematic structural diagram of a wake-up signal processing apparatus provided by some embodiments according to the present disclosure.

As shown in FIG. 5, the embodiments according to the present disclosure provides a wake-up signal processing apparatus, which includes a first determination module 110 and a second determination module 120.

The first determination module 110 is configured to respectively determine frequentnesses Ni of a wake-up signal being applied to different types of first cycles, wherein each of Ni is the number of the corresponding first cycle in which a terminal maintains a sleep state during an On Duration, and values of Ni are 0 or a positive integer, and wherein, the frequentnesses means one or more frequentness.

The second determination module 120 is configured to determine a terminal state of the terminal during On Duration in a corresponding type of first cycle, according to the frequentness and a monitoring result of the wake-up signal, wherein the terminal state is a wake-up state or the sleep state.

In some embodiments, the first determination module 110 and the second determination module 120 may be program modules. After the program modules are executed by the processor, the frequentness N can be determined and the terminal state can be determined.

In other embodiments, the first determination module 110 and the second determination module 120 may be a combination of hardware and software modules, which include but are not limited to programmable arrays; programmable arrays include but are not limited to complex programmable arrays or on-site programmable array.

In some other embodiments, the first determination module 110 and the second determination module 120 may be pure hardware modules; and the pure hardware modules include, but are not limited to, application specific integrated circuits.

In some embodiments, types of the first cycles include:
a first type of first cycle, which is located after a drx-Inactivity Timer expires, and wherein the second cycle is greater than the first cycle;
a second type of first cycle, which is located after a control unit of a media access control layer (MAC CE) is issued.

In some embodiments, a frequentness of a wake-up signal for the first type of first cycle is the same as a frequentness of a wake-up signal for the second type of first cycle.

In other embodiments, the frequentness of the wake-up signal for the first type of first cycle is different from the frequentness of the wake-up signal for the second type of first cycle.

In some embodiments, the apparatus further includes a receiving module, which is configured to receive the frequentness of the wake-up signal being applied to the first cycle carried by a Radio Resource Control RRC message or a MAC CE; and the first determination module 110 is further configured to determine the frequentnesses N of wake-up signal being applied to different types of first cycles, according to the frequentness M of wake-up signal being applied to the first cycle carried by the radio resource control RRC message or the MAC CE.

In some embodiments, the frequentness of the wake-up signal being applied to the first cycle, which is carried by the RRC message or the MAC CE, is a frequentness being applied to the first type of first cycle, and is not a frequentness being applied to the second type of first cycle.

In some embodiments, the frequentness of the wake-up signal being applied to the second type of first cycle is the same as the frequentness of the wake-up signal being applied to the second cycle.

In some embodiments, the frequentness of the wake-up signal being applied to the first cycle, which is carried by the RRC message or the MAC CE, is a frequentness being applied to the second type of first cycle, and is not a frequentness being applied to the first type of first cycle.

In some embodiments, the frequentness of the wake-up signal being applied to the first type of first cycle is the same as the frequentness of the wake-up signal being applied to the second cycle.

In some embodiments, the frequentness M1 of wake-up signal being applied to the first type of first cycle is carried by the RRC message or MAC CE, wherein M1 is 0 or a positive integer; the frequentness M2 of wake-up signal being applied to the second type of first cycle is carried by the RRC message or MAC CE, wherein M2 is 0 or a positive integer.

In some embodiments, the frequentness of the wake-up signal being applied to the first cycle carried by the RRC message or the MAC CE is a frequentness being applied to the first cycle between current indication and a next indication from network side indicating a frequentness of a wake-up signal being applied to the first cycle; or
the frequentness of the wake-up signal being applied to the first cycle, i.e., frequentness carried by the RRC message or MAC CE, is a frequentness being applied to the first cycle triggered by the transmission of the MAC CE.

In some embodiments, the frequentness of the wake-up signal being applied to the first cycle carried by the RRC message or the MAC CE is a frequentness being applied to the first cycle between current indication and a next indication from network side indicating a frequentness of a wake-up signal being applied to the first cycle may include any one of the followings:
the frequentness of the wake-up signal being applied to the first cycle carried by current MAC CE is a frequentness being applied to the first cycle between the current MAC CE and a next MAC CE carrying a frequentness of a wake-up signal being applied to the first cycle; or
the frequentness of the wake-up signal being applied to the first cycle carried by current RRC message is a frequentness being applied to the first cycle between the current RRC message and a next RRC message carrying a frequentness of a wake-up signal being applied to the first cycle; or
the frequentness of the wake-up signal being applied to the first cycle carried by current MAC CE is a frequentness being applied to the first cycle between the current MAC CE and a RRC message carrying a frequentness of a wake-up signal being applied to the first cycle next to the current MAC CE; or
the frequentness of the wake-up signal being applied to the first cycle carried by current RRC message is a frequentness being applied to the first cycle between the current RRC message and a MAC CE carrying a frequentness of a wake-up signal being applied to the first cycle next to the current RRC.

In some embodiments, the frequentness of the wake-up signal being applied to the first cycle is independent of the frequentness of the wake-up signal being applied to the second cycle.

In some embodiments, the wake-up signal is not configured with a frequentness applied to the second cycle.

Figure 6:
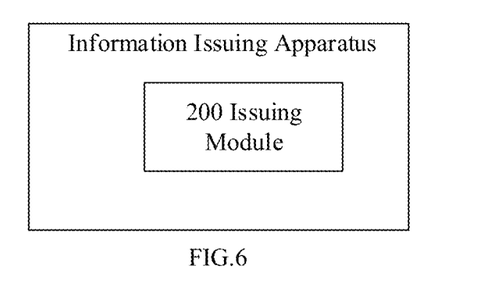
FIG. 6 is a schematic structural diagram of an information issuing apparatus provided by some embodiments according to the present disclosure.

As shown in FIG. 6, this embodiment also provides an information issuing apparatus, which includes an issuing module 200.

The issuing module 200 is configured to issue a radio resource control RRC message or MAC CE carrying a frequentness M of a wake-up signal being applied to a first cycle.

In this embodiment, the information issuing apparatus further includes a storage module. The storage module is used to store the frequentness of the wake-up signal being applied to the first cycle.

In some embodiments, according to an idle bit in the RRC message or the MAC CE and/or the issuing delay and frequentness delay requirements, the frequentness of the wake-up signal being applied to the first cycle carried by the RRC message or the MAC CE is selected.

Several specific examples are provided below in conjunction with any of the foregoing embodiments.

Example 1

In the Narrow Band Internet Of Thing (NB-IOT) and Enhance Machine Type Communication (eMTC) projects, WUS has been introduced. WUS is a low-power detection signal. If the terminal detects WUS, it means that PDCCH monitoring is required, but if WUS is not detected, all On Durations within the effective range of WUS will remain the sleep state, thereby skipping PDCCH monitoring.

In the scenario of configuring DRX, WUS is usually configured before the On Duration of DRX. If the terminal does not detect WUS, the entire On Duration needs to be skipped. Skipping the entire On Duration means the terminal does not wake up and remains in the sleep state during the entire On Duration.

If the DRX short cycle is configured, it can be used after the inactivity timer expires or after the MAC CE, but the purposes for the two to use the DRX short cycle are different.

Putting WUS after the DRX long cycle is to transmit a large amount of data arriving after the inactive time timer (i.e., the drx-Inactivity Timer) expires; and the DRX short cycle after MAC CE is only used for the sporadic data arrived after the network has judged that there is no data. Therefore, the necessities for the two to use WUS are different.

In case that both the DRX long cycle and the DRX short cycle in the WUS mechanism use the same WUS pattern, if WUS is used for the DRX long cycle, it means that the data packet arrives after the WUS decision, which will cause catastrophic consequences for the delay. Therefore, if the WUS pattern for the DRX short cycle is directly used without distinguishing the types, then various problems that are not applicable to the current transmission scenario would be caused also.

Example 2

Based on Example 1, this example continues to provide a WUS processing method. WUS acts on different time periods of the DRX short cycle, that is, a DRX short cycle entered after the inactive timer expires (i.e., the first type of short cycle) and a DRX short cycle after the MAC CE is issued (i.e., the second type of short cycle). The frequentness of using WUS to skip the On Duration can be consistent or inconsistent.

As an implementation, the frequentness of skipping the On Duration of WUS may be N=1.

As an implementation, the frequentness of skipping the On Duration of WUS may be N, which is an integer greater than one.

As an implementation, if the frequentness of skipping the On Duration of WUS is 0, the situation that maintaining the sleep state during the On Duration appeared after WUS does not take effect, that is, the monitoring pattern of WUS is completely ignored, that is, the original DRX mode is entered.

The base station instructs the terminal by signaling what type of DRX short cycle the WUS acts on, i.e., related parameters and the effective mode of the DRX short cycle. The terminal can be notified by the RRC message and MAC CE. This signaling includes but is not limited to the RRC message and/or MAC CE. In some embodiments, the signaling may also include physical layer signaling, for example, physical downlink control information (DCI) carries information such as the frequentness of WUS.

As an implementation, the RRC message separately indicates frequentnesses of a wake-up signal being applied to different types of first cycles for skipping the On Duration. For example, the first type of short cycle is configured with a denser WUS monitoring frequency or configured with a monitoring frequentness of N=0, while the second type of short cycle is configured with a relatively sparse WUS monitoring frequency; and the second type of short cycles is a short cycle entered after each receiving the issued MAC CE, and its duration is prescribed in accordance with the current agreement. The relatively dense and sparse WUS monitoring frequency are related to the size of the frequentness N. If the frequentness N is large, the WUS monitoring frequency is sparse, and if the frequentness N is small, the WUS monitoring frequency is dense.

As an implementation, the frequentness N of skipping the On Duration indicating a power saving parameter in the RRC message is only applicable to the first type of short cycle, but not applicable to the second type of short cycle.

The frequentness of skipping On Durations of WUS used in the second type of short cycle may use the frequentness of skipping On Duration of WUS having the same cycle length.

As an implementation, the frequentness of skipping the On Duration indicating the power saving parameter in the RRC message is only applicable to the second type of short cycle, and not applicable to the first type of short cycle.

The frequentness of skipping On Durations of WUS used in the first type of short cycle may use the frequentness of skipping On Duration of WUS having the same cycle length.

As an implementation, the frequentness of skipping the On Duration for the power saving parameter of the short cycle notified in the MAC CE is only applicable to current second type of short cycle entered after the MAC CE issuance is received this time, and not applicable in the first type of short cycle. Wherein, the current duration of the second type of short cycle is specified in accordance with the current protocol, for example, it may be the time length of a timer (i.e., the drx Short Cycle Timer) that has been defined in the standard.

As an implementation, the frequentness of skipping the On Duration for the power saving parameter of the short cycle notified in the MAC CE is only applicable to current second type of short cycle entered after the MAC CE issuance is received this time, until receiving an explicit notification instruction etc. from the network side the next time. Wherein this command is not applicable in the first type of short cycle.

While WUS acts on the DRX short cycle, the frequentness of skipping the On Duration of the DRX long cycle of WUS is independent of the short cycle configuration.

As an implementation, WUS may not be used in the DRX long cycle configuration.

The communication apparatus provided in this embodiment includes a transceiver, a memory, and a processor. The transceiver can be used to interact with other devices. The transceiver includes but is not limited to a transceiver antenna. The memory can store computer-executable instructions; the processor is connected to the transceiver and the memory respectively, and can implement the wake-up signal processing method or the information issuing method provided by any of the foregoing technical solutions, for example, execute at least one of methods shown in FIG. 3A, FIG. 3B and FIG. 4.

Figure 7:
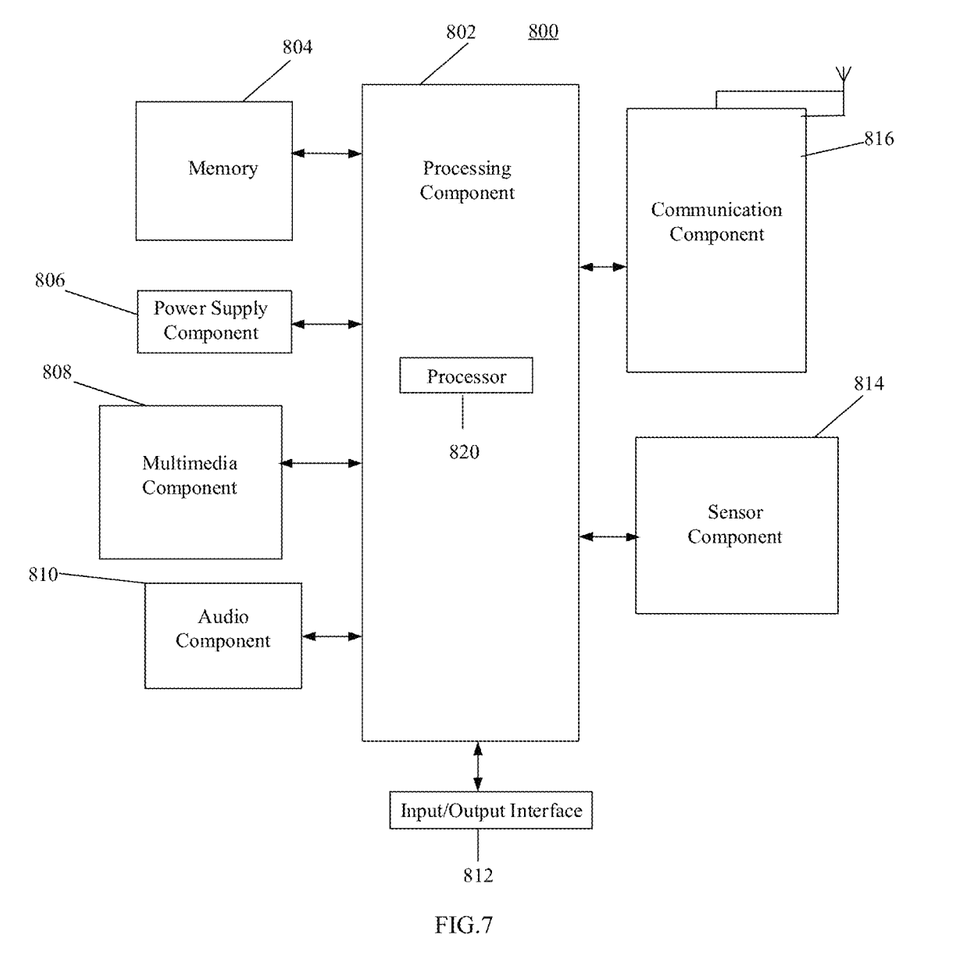
FIG. 7 is a schematic structural diagram of a terminal provided by some embodiments according to the present disclosure.

FIG. 7 is a terminal shown according to some embodiments of the present disclosure. The terminal may be a mobile phone, a computer, a digital broadcasting terminal, a messaging device, a game console, a tablet device, a medical device, a fitness device, a personal digital assistant, etc.

Referring to FIG. 7, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the terminal 800, such as operations associated with displaying, telephone calls, data communication, camera operations, and recording operations. The processing component 802 may include one or more processors 920 to execute instructions to complete all or part of the steps in the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the device 800. Examples of these data include instructions for any application or method operating on the device 800, contact data, phone book data, messages, pictures, videos, and so on. The memory 804 may be implemented by any type of volatile or non-volatile storage device or a combination of the any type of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the device 800. The power supply component 806 may include a power supply management system, one or more power supplies, and other components associated with generating, managing, and distributing power for the terminal 800.

The multimedia component 808 includes a screen that provides an output interface between the terminal 800 and the user. In some examples, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation.

In some examples, the multimedia component 808 includes a front camera and/or a rear camera. When the device 800 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 810 is configured to output and/or input audio signals. For example, the audio component 810 includes a microphone (MIC). When the terminal 800 is in an operation mode, such as a call mode, a recording mode, and a voice recognition mode, the microphone is configured to receive an external audio signal. The received audio signal may be further stored in the memory 804 or transmitted via the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, a button and so on. These buttons may include, but are not limited to: home button, volume button, start button, and lock button.

The sensor assembly 814 includes one or more sensors for providing the status assessment of various aspects for the terminal 800. For example, the sensor component 814 can detect the on/off state of the device 800, and the relative positioning of the components, for example, the component is a display and a keypad of the terminal 800, and the sensor component 814 can also detect the position change of the terminal 800 or a component of the terminal 800, the presence or absence of user contact with the terminal 800, the orientation or acceleration/deceleration of the terminal 800, and the temperature change of the terminal 800. The sensor assembly 814 may include a proximity sensor configured to detect the presence of nearby objects without any physical contact. The sensor assembly 814 may also include a light sensor, such as a CMOS or CCD image sensor, for use in imaging applications. In some examples, the sensor assembly 814 may also include an acceleration sensor, a gyro sensor, a magnetic sensor, a pressure sensor, or a temperature sensor.

The communication component 816 is configured to facilitate wired or wireless communication between the terminal 800 and other devices. The terminal 800 can access a wireless network based on a communication standard, such as WiFi, 2G, or 3G, or a combination of the communication standard. In an example, the communication component 816 receives a broadcast signal or broadcast related information from an external broadcast management system via a broadcast channel. In an example, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the terminal 800 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the interface display method described in any of the above examples.

In an example, there is also provided a non-transitory computer-readable storage medium including instructions, such as a memory 804 including instructions, which can be executed by the processor 820 of the terminal 800 to complete the above method. For example, the non-transitory computer-readable storage medium may be ROM, random access memory (RAM), CD-ROM, magnetic tape, floppy disk, optical data storage device, or the like.

Figure 8:
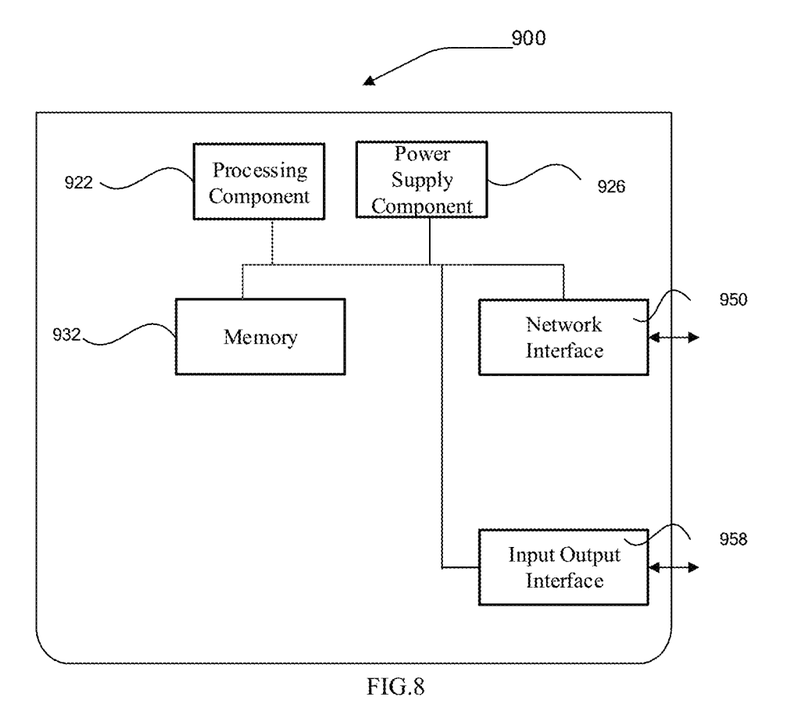
FIG. 8 is a schematic structural diagram of a base station provided by some embodiments according to the present disclosure.

FIG. 8 is a schematic diagram of a base station. Referring to FIG. 8, the base station 900 includes a processing component 922, which further includes one or more processors, and a memory resource, represented by memory 932, for storing instructions executable by processing component 922, such as application programs. An application program stored in memory 932 may include one or more modules, each corresponding to a set of instructions. Furthermore, the processing component 922 is configured to execute the instructions to perform the PDCCH monitoring method shown in FIG. 4 and/or FIG. 5.

The base station 900 may also include a power supply assembly 926 configured to perform power management of the base station 900, a wired or wireless network interface 950 configured to connect the base station 900 to a network, and an input output (I/O) interface 958. Base station 900 may operate based on an operating system stored in memory 932, such as Windows Server™, Mac OS X™, Unix™, Linux™, Free BSD™ or the like.

Embodiments of the present disclosure further provide a non-transitory computer-readable storage medium, wherein computer-executable instructions are stored on the non-transitory computer-readable storage medium; after the computer-executable instructions are executed by a processor, any of the foregoing wake-up signal processing method and/or the information issuing method provided by the technical solution is performed, for example, at least one of the methods shown in FIG. 3A, FIG. 3B and FIG. 4.

Those skilled in the art will easily think of other examples of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A wake-up signal processing method, applied to a terminal, comprising:
    determining frequentnesses Ni of a wake-up signal being applied to different types of first cycles, wherein each of Ni is a number of a corresponding first cycle in which the terminal maintains a sleep state during an On Duration, and respective values of Ni are a positive integer;
    monitoring the wake-up signal; and
    according to one of frequentnesses Ni and a monitoring result of the wake-up signal, determining a terminal state of the terminal during the On Duration in a corresponding type of first cycle, wherein the terminal state is a wake-up state or the sleep state;
    wherein the different types of the first cycles comprises:
    a first type of first cycle, located after a drx-Inactivity Timer expires; and
    a second type of first cycle, located after a control unit of a media access control layer (MAC CE) is issued.

2. The method according to claim 1, wherein one of frequentnesses Ni of a wake-up signal for the first type of first cycle is the same as one of frequentnesses Ni of a wake-up signal for the second type of first cycle; or
    the one of frequentnesses Ni of the wake-up signal for the first type of first cycle is different from the one of frequentnesses Ni of the wake-up signal for the second type of first cycle.

3. The method according to claim 1, further comprising:
    receiving a frequentness of a wake-up signal being applied to the first cycle carried by a radio resource control (RRC) message or a MAC CE;
    wherein determining the frequentnesses Ni of the wake-up signal being applied to different types of first cycles comprises:
    according to the frequentness of the wake-up signal being applied to the first cycle carried by the radio resource control RRC message or the MAC CE, determining the frequentnesses Ni of the wake-up signal being applied to different types of first cycles.

4. The method according to claim 3, wherein the frequentness of the wake-up signal being applied to the first cycle carried by the RRC message or the MAC CE is a frequentness being applied to the first type of first cycle, and is not a frequentness being applied to the second type of first cycle.

5. The method according to claim 4, wherein the frequentness of the wake-up signal for the second type of first cycle is the same as a frequentness of a wake-up signal being applied to a second cycle, wherein the second cycle is greater than the first cycle.

6. The method according to claim 3, wherein the frequentness of the wake-up signal being applied to the first cycle carried by the RRC message or the MAC CE is a frequentness being applied to the second type of first cycle, and is not a frequentness being applied to the first type of first cycle.

7. The method according to claim 6, wherein the frequentness of the wake-up signal being applied to the first type of first cycle is the same as a frequentness of a wake-up signal being applied to a second cycle, wherein the second cycle is greater than the first cycle.

8. The method according to claim 3, wherein the frequentness of the wake-up signal being applied to the first cycle carried by the radio resource control RRC message or the MAC CE comprises:
    a frequentness M1 of a wake-up signal being applied to the first type of first cycle carried by the RRC message or the MAC CE, wherein M1 is 0 or a positive integer; or
    a frequentness M2 of a wake-up signal being applied to the second type of first cycle carried by the RRC message or the MAC CE, wherein M2 is 0 or a positive integer.

9. The method according to claim 3, wherein the frequentness of the wake-up signal being applied to the first cycle carried by the RRC message or the MAC CE is a frequentness being applied to the first cycle between current indication and a next indication from network side indicating a frequentness of a wake-up signal being applied to the first cycle; or the frequentness of the wake-up signal being applied to the first cycle carried by the MAC CE is a frequentness being applied to the first cycle triggered by transmission of the MAC CE.

10. The method according to claim 9, wherein the frequentness of the wake-up signal being applied to the first cycle carried by the RRC message or the MAC CE is a frequentness being applied to the first cycle between current indication and a next indication from network side indicating a frequentness of a wake-up signal being applied to the first cycle comprises one of following:

the frequentness of the wake-up signal being applied to the first cycle carried by current MAC CE is a frequentness being applied to the first cycle between the current MAC CE and a next MAC CE carrying a frequentness of a wake-up signal being applied to the first cycle;

the frequentness of the wake-up signal being applied to the first cycle carried by current RRC message is a frequentness being applied to the first cycle between the current RRC message and a next RRC message carrying a frequentness of a wake-up signal being applied to the first cycle;

the frequentness of the wake-up signal being applied to the first cycle carried by current MAC CE is a frequentness being applied to the first cycle between the current MAC CE and a RRC message carrying a frequentness of a wake-up signal being applied to the first cycle next to the current MAC CE; or the frequentness of the wake-up signal being applied to the first cycle carried by current RRC message is a frequentness being applied to the first cycle between the current RRC message and a MAC CE carrying a frequentness of a wake-up signal being applied to the first cycle next to the current RRC.

11. The method according to claim 1, wherein the frequentness of the wake-up signal being applied to the first cycle is independent of a frequentness of a wake-up signal being applied to a second cycle, wherein the second cycle is greater than the first cycle.

12. The method according to claim 1, wherein the wake-up signal is not configured with a frequentness applied to a second cycle, wherein the second cycle is greater than the first cycle.

13. A communication device, applied to a terminal, comprising:

a transceiver;

a memory; and a processor connected to the transceiver and the memory respectively, and configured to control a transmission and a reception of the transceiver by executing computer-executable instructions stored on the memory, wherein the processor is configured to:

determine frequentnesses Ni of a wake-up signal being applied to different types of first cycles, respectively, wherein each of Ni is a number of a corresponding first cycle in which the terminal maintains a sleep state during an On Duration, and respective values of Ni are a positive integer;

monitor the wake-up signal; and according to one of frequentnesses Ni and a monitoring result of the wake-up signal, determine a terminal state of the terminal during the On Duration in a corresponding type of first cycle, wherein the terminal state is a wake-up state or the sleep state;

wherein the different types of the first cycles comprises:

a first type of first cycle, located after a drx-Inactivity Timer expires; and a second type of first cycle, located after a control unit of a media access control layer (MAC CE) is issued.

* * * * *